United States Patent [19]

Weiss

[11] 4,273,952
[45] Jun. 16, 1981

[54] BUS BAR FOR A CARD FRAME FOR CIRCUIT CARDS

[75] Inventor: Harald Weiss, Bremen-Arnsten, Fed. Rep. of Germany

[73] Assignee: Vero Electronics GmbH, Bremen, Fed. Rep. of Germany

[21] Appl. No.: 970,802

[22] Filed: Dec. 18, 1978

Related U.S. Application Data

[63] Continuation-in-part of Ser. No. 790,558, Apr. 25, 1977, abandoned.

[30] Foreign Application Priority Data

Apr. 28, 1976 [DE] Fed. Rep. of Germany ... 7613433[U]

[51] Int. Cl.³ .............................................. H02G 5/00
[52] U.S. Cl. .................................. 174/68 B; 174/72 B
[58] Field of Search ................ 174/72 B, 68 B, 99 B, 174/70 B, 71 B, 72 B, 88 B; 361/355, 361, 378, 413

[56] References Cited

U.S. PATENT DOCUMENTS 3,217,090  11/1965  Stegmaier .......................... 174/72 B
3,312,870  4/1967  Rhoades .......................... 174/72 B X

FOREIGN PATENT DOCUMENTS 7613433  10/1976  Fed. Rep. of Germany .
2349984  11/1977  France ................................... 174/72 B Primary Examiner—Thomas J. Kozma
Attorney, Agent, or Firm—Watson, Cole, Grindle & Watson

[57] ABSTRACT

A bus bar for a card frame for receiving circuit cards, said bus bar comprising a carrier having a recess of U-section, an electrically insulating housing press fitted into said recess and having side walls which are relatively movable, and a plurality of electrically conducting strips, separated by electrically insulating foils, the strips being disposed side by side within the housing and held therein by lateral pressure from said housing.

5 Claims, 5 Drawing Figures

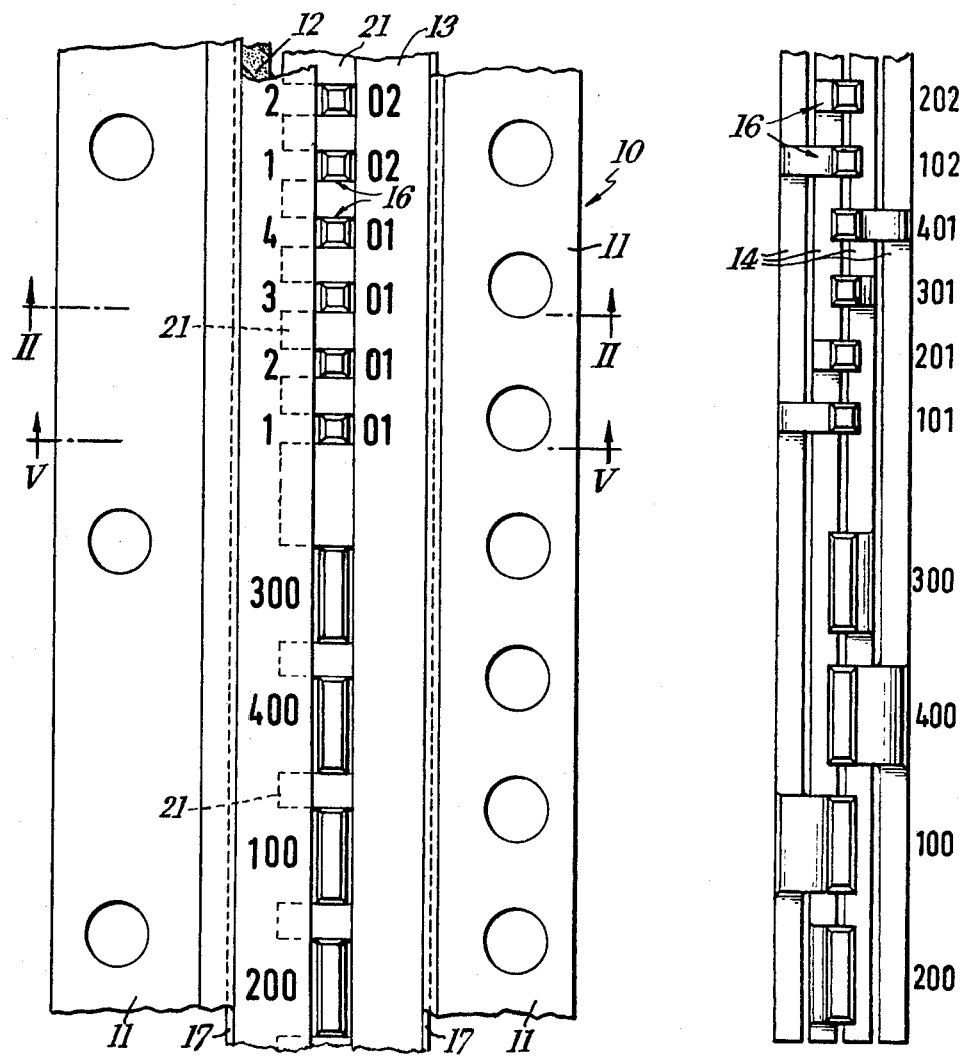
*Fig. 1.*
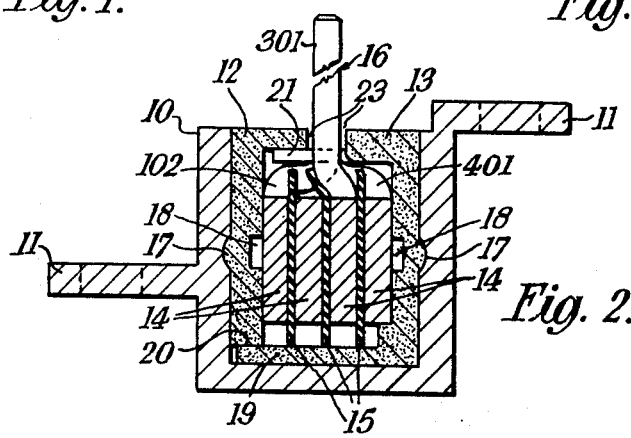
*Fig. 2.*
*Fig. 3.*

BUS BAR FOR A CARD FRAME FOR CIRCUIT CARDS

This application is a continuation-in-part of my U.S. Pat. application Ser. No. 790,558 filed Apr. 25th 1977, now abandoned.

BACKGROUND OF THE INVENTION

This invention relates to a bus bar for a card frame for circuit cards of the kind comprising a carrier having a recess of U-section which contains electrically conducting strips separated by electrically insulating foils.

In a known construction, the strips and the foils are embedded in a mass of cast synthetic resin. This procedure has the disadvantage that it is necessary for the strips to be supported by a jig in the liquid resin for a very considerable time, often of the order of 48 hours, while the resin cures and solidifies. This is not only time consuming but considerable difficulty arises in ensuring that the strips are maintained at their correct relative spacing throughout this long period. It is the object of the invention to obviate these difficulties.

SUMMARY OF THE INVENTION

The invention provides a bus bar for a card frame for receiving circuit cards, said bus bar comprising a carrier of U-section, into which is press fitted an electrically insulating housing having side walls which are relatively movable and a plurality of electrically conducting strips, separated by electrically insulating foils, the strips being disposed side by side and under lateral pressure within the housing.

In this bus bar the strips and foils are held together by uniform and continuing lateral pressure and relative movement of said side walls enables them to exert such pressure notwithstanding dimensional tolerances in the assembly.

BRIEF DESCRIPTION OF THE DRAWINGS

Two embodiments of bus bar according to the invention are illustrated, by way of example, in the accompanying drawings, in which:

FIG. 1 is a plan view of one embodiment of the bus bar,

FIG. 2 is a cross section on the line II—II in FIG. 1,

FIG. 3 is a diagrammatic plan view showing the relative positions of the conducting strips when mounted in the bar, the intervening foils being omitted.

DESCRIPTION OF THE PREPARED EMBODIMENTS

Figure 4:
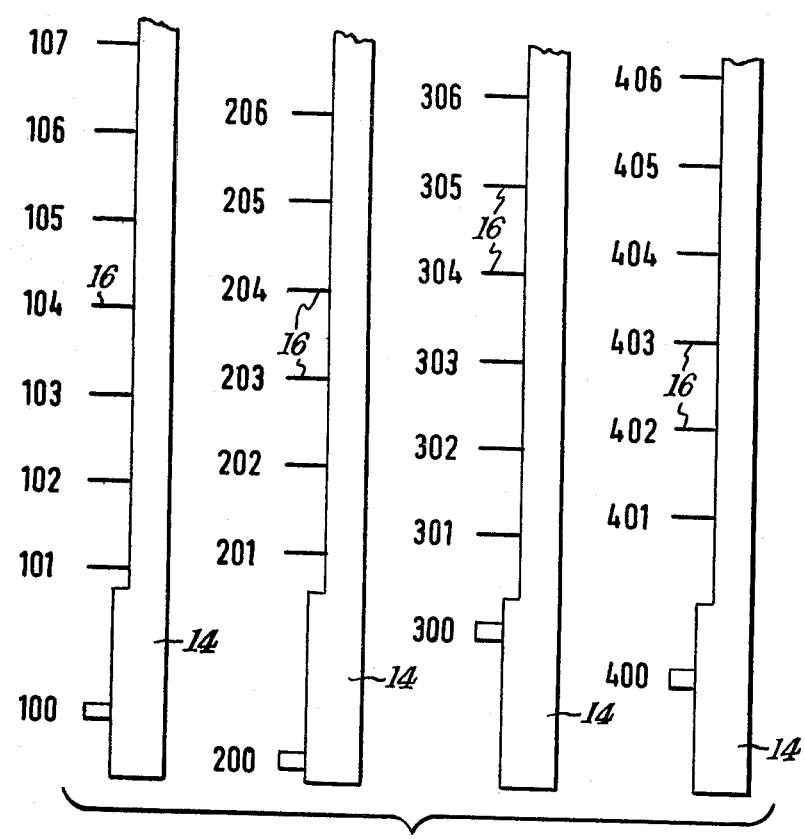
FIG. 4 is a diagram illustrating the relative dispositions of the posts and the input terminals on the individual conducting strips.

The bus bar shown in FIGS. 1 and 2 includes an extrusion 10 of U-section having projecting flanges 11 for attaching the bar to a card frame (not shown) for receiving circuit cards. Into the recess in the extrusion is press fitted a packet which includes an electrically insulating housing, formed in two parts 12 and 13, and a plurality of electrically conducting strips 14, each of which has on one side a self-adhesive foil 15 of electrically insulating material. Lateral pressure is exerted on the strips 14 and the foils 15 by the parts 12 and 13 of the housing, which have external ribs 17, which are press fitted into corresponding recesses in the extrusion 10, and internal recesses 18 adjacent the ribs 17 to increase their flexibility. The foils 15 have a thickness of a few hundredths of a millimeter and serve to center the strips 14 in the housing.

As will be seen from FIG. 2, the part 13 of the housing has an inwardly extending flange 19 on which the base of the part 12 abuts to make sliding contact at 20 and spaced fingers 21 on the upper portion of the part 13 make sliding contact with upstanding posts on the strips 14 in pairs, gaps 23 between the parts of the housing and the posts permitting of relative sliding movement of the parts 12, 13, as the packet is inserted into the recess in the extrusion 10.

As shown most clearly in the diagrams constituting FIGS. 3 and 4, each of the four conducting strips 14 carries a series of upstanding posts 101, 102..; 201,202...; 301, 302...; and 401,402...; respectively, and an upstanding and a larger input terminal. The four input terminals are respectively numbered 100, 200, 300, 400. Wires can be wrapped around the posts to establish electrical connections to the strips to which appropriate voltages are applied at their input terminals. As will be seen the posts and the input terminals on the strips are staggered and are also cranked so that they are in alignment in the lengthwise direction of the extrusion 10. As shown in FIG. 1 indicia are provided on the housing portions 12, 13 to designate the particular strips 14 to which the various posts and input terminals are allocated. The posts 16 are interleaved, in accordance with the staggering indicated in FIG. 4 in which the strips are arranged in order from left to right as seen in FIG. 2, in which they are assembled in the bus bar. As will be seen the posts nearest the input terminal, i.e. 101, 201, 301, 401, are arranged in sequence and followed by the next following posts 102, 202, 302, 402 and so on. This numbering is for the purpose of facilitating wiring by the operator to posts on the strips connected to desired input terminals.

To assemble the bus bar, the strips 14 are assembled in the desired order between the housing parts 12, 13 and the resulting package is then press fitted into the recess in the extrusion 10, the parts 12, 13 sliding as necessary with respect to one another to permit this, whereafter notwithstanding manufacturing tolerances the parts 12, 13 exert sufficient lateral pressure on the strips 14 to retain them firmly in position.

Figure 5:
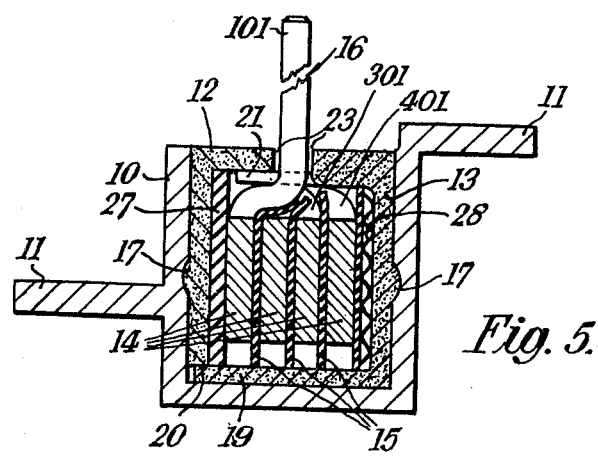
FIG. 5 is a cross section corresponding to that shown in FIG. 2 but taken at a location indicated at V—V in FIG. 1 and illustrating the other embodiment of bus bar.

The modified embodiment shown in FIG. 5 differs only in that the internal recesses in the extension 10 are omitted and resilient inserts 27, 28 are provided between the side walls of the housing members 12, 13 and the conducting strips 14. The insert 27 is of foam rubber and the insert 28 is a currugated spring plate.

What I claim as my invention and desire to secure by Letters Patent is:

1. A bus bar for a card frame for receiving circuit cards, said bus bar comprising a carrier having a recess of U-section, an electrically insulating housing press fitted into said recess and having side walls which are relatively movable, and a plurality of electrically conducting strips, separated by electrically insulating foils, the strips being disposed side by side within the housing and held therein by lateral pressure from said housing.

2. A bus bar according to claim 1, in which the housing consists of two relatively slidable parts.

3. A bus bar according to claim 1, in which the side walls of the housing and the carrier have inter-engaging ribs and recesses.

4. A bus bar according to claim 3, in which grooves are provided in the inner surfaces of the side walls of the housing adjacent the ribs.

5. A bus bar according to claim 1, further compressing a resilient insert disposed between the strips and a side wall of the housing.

* * * * *